United States Patent Office 3,699,118
Patented Oct. 17, 1972

---

3,699,118
REACTION PRODUCTS OF SUBSTITUTED IMIDAZOLINES AND AMINO TRI(LOWER ALKYLIDENEPHOSPHONIC ACIDS)
James E. Donham, Houston, Tex., assignor to Amoco Production Company, Tulsa, Okla.
No Drawing. Filed Apr. 14, 1969, Ser. No. 816,031
Int. Cl. C07d 49/34
U.S. Cl. 260—309.6
2 Claims

ABSTRACT OF THE DISCLOSURE

An amino phosphonic acid is made dispersible in organic solvents to form clear solutions by reacting the acid in water solution with an imidazoline having an alkyl side chain containing at least about eight carbon atoms. The resulting reaction product is highly soluble in a wide variety of organic solvents. It is useful as a scale inhibitor, corrosion inhibitor, paraffin solvent and inhibitor, and acid retarder in oil wells. It has other uses in the oil field and outside the oil field.

---

Use of the amino phosphonic acids as scale inhibitors, sequestering agents, deflocculating agents, and the like, has been previously described in references, such as U.S. Pats. 2,599,807 Bersworth, 2,917,528 Ramsey et al., 3,234,124 Irani, 3,336,221 Ralston, 3,346,488 Lyons et al., and 3,393,150 Ralston. The water-soluble salts of the phosphonic acids may also be used. For example, U.S. Pat. 3,234,124 Irani describes the use of water-soluble amine salts of phosphonic acids in drilling fluids. Amino phosphonic acids and their salts, which are soluble in organic solvents, are described in U.S. Pat. 2,841,611 Berworth. In these, however, the number of phosphonic acid groups per molecule, and hence the effectiveness of the compounds, has been reduced in the process of achieving a limited degree of solubility in organic solvents.

A highly effective amino phosphonic acid, which is soluble in organic solvents, is desirable. In particular, a substantially non-aqueous solution, which can be diluted with hydrocarbons is needed. Bersworth mentions use of such compositions as detergents, metal carriers, and as lubricating oil additives. Another important application is to the treatment of oil-bearing earth formations. An advantageous way of treating an oil well with a scale inhibitor, such as an amino phosphoric acid, is to squeeze the inhibitor back into the formation surrounding the well so the inhibitor will be produced slowly into the well with the scale-forming water. Sometimes, however, it is undesirable to squeeze a water solution into an oil-bearing formation. The formation may be water-sensitive so its permeability is greatly reduced by water, or even brine of a composition different from that naturally present in the formation. In such cases, it would be very desirable to squeeze a substantially non-aqueous solution of the inhibitor into the oil-bearing formation. At least a solution should be used that will not contact the formation with free water. The inhibitor would then slowly enter the well simultaneously with scale-forming water produced from other zones. An oil-soluble scale inhibitor, which would also inhibit corrosion by hydrogen sulfide, carbon dioxide, and low molecular-weight organic acids commonly found in oil wells, would obviously also be desirable.

An object of this invention is to provide an amino phosphonic acid in a form soluble in organic solvents. Another object is to provide a substantially non-aqueous solution of an amino phosphonic acid scale inhibitor for use in oil wells and in oil-bearing formations surrounding such wells. Still another object is to provide an oil-soluble amino phosphonic acid scale inhibitor, which also inhibits corrosion by hydrogen sulfide, carbon dioxide, and low molecular-weight organic acids. Still other objects will be apparent from the following description and claims.

In general, I accomplish the objects of my invention by reacting an oil-soluble substituted imidazoline with the phosphonic acid. Due to some pecularity of the phosphonic acids, the reaction product of an amine and a substantially anhydrous phosphonic acid is substantially insoluble in most solvents, both aqueous and non-aqueous. I have found, however, that the reaction product of an amine with an aqueous solution of certain phosphonic acids is soluble in a mixture of organic solvents, such as a mixture of an octanol and methanol. This solution is, in turn, soluble in other organic solvents which may even include hydrocarbons, such as kerosene. Solubility of the amine salt in liquid hydrocarbons, as well as in other organic solvents, can be increased by the addition of oil-soluble carboxylic acids. These acids also enhance the corrosion-inhibiting ability of the reaction products of amines with aqueous solutions of amino phosphonic acids.

The class of amino phosphonic acids usable in my composition is very limited. In water solutions, the amino phosphonic acids can be used as water-soluble salts of alkali metals, for example. In preparing substantially non-aqueous solutions, however, such metallic salts should be avoided. The metallic ion greatly complicates dissolving, in an organic solvent, the reaction product of the aqueous solution of the phosphonic acid and an oil-soluble amine. As previously noted, the amine phosphonate is sufficiently soluble in organic solvents only if the salt is formed between the amine and a water solution of the phosphonic acid. Since a metallic salt cannot be used, the phosphonic acids must be limited to those which are rather highly soluble in water in the free acid form. Only one such class is known to exist. This class is best described in U.S. Pat. 3,234,124 Irani. These amino phosphonic acids have the formula

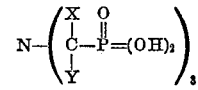

wherein X and Y represent hydrogen or a lower alkyl group. The class can be described as amino tri(lower alkylidene phosphonic acid). The compound preferred because of its high water solubility is amino tri(methyl phosphonic acid). The high water solubility is important to permit use of as little water as possible to dissolve the acid and thus produce a composition which is as water-free as possible.

The minimum amount of water is a quantity sufficient to dissolve the phosphonic acid. It has been found that considerably more than this minimum amount should be used since an increased water content surprisingly increases the solubility of the amine salt in organic solvents. This apparently contradictory finding may be explained by the tendency of the highly polar phosphonic acid to be strongly solvated by water. Thus, the water is not present as free water, but is bound to the phosphonic acid by solvation forces. For the same reason, this water does not damage water-sensitive formations. Apparently, the amino tri(methyl phosphonic acid) dissolves in less water than can be held by solvation forces. The amines salt of the completely solvated phosphonic acid seems to be more soluble in organic solvents than the incompletely solvated acid salts. While this theory may explain the unusual behavior of the amine salts of the amino phosphonic acids, I do not, of course, wish to be bound by this theory.

Regardless of the theory, it has been found that if the phosphonic acid is amino tri(methyl phosphonic acid), the amount of water should be at least about half the weight of the acid if the amine salt is to form a clear solution in organic solvents at approximately room temperature. Preferably, the amount of water should be from about one to two times the weight of phosphonic acid. As much as four or five times as much water as phosphonic acid by weight may actually improve the solubility characteristics of the amine salt of the acid. As previously noted, most of this water is not free water, but is bound to the phosphonic acid by forces of solvation. The amine and any water-soluble alcohols, which may be used in the organics solvent system, may also hold some water by solvation forces. For various phosphonic acids, amines and solvents, these water-content values may change considerably, but should be near this general range.

The amine should be of the type described, for example, in U.S. Pat. 2,468,163 Blair et al. That is, it should be a substituted imidazoline containing at least one aliphatic or cycloaliphatic hydrocarbon group containing from about eight to about 32 carbon atoms the formula should be

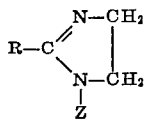

in which either R or Z, or both contain or consist of an aliphatic or cycloaliphatic radical containing from 8 to 32 carbon atoms. These cyclic amidines form amino phosphonic acid salts having unusual solubility characteristics when compared to other amine salts of the phosphonic acids. When reference is made to amine salts of phosphonic acids, it will be understood that the reaction product is intended of the amine with phosphonic acid dissolved in water in an amount equal to from about one-half to about five times the weight of the phosphonic acid.

The amount of amine may be less than sufficient to neutralize completely the phosphonic acid. In order to give the phosphonic acid a desirable degree of solubility in organic solvents, however, the amount of amine should be at least about one-half that sufficient to neutralize the acid. Preferably, the amount of amine should be equal to at least three-fourths that necessary to neutralize the phosphonic acid completely. It has been found that an excess of amine over that necessary to neutralize the acid is not harmful but actually further improves solubility of the salt in organic solvents. This may be due to the formation of a loose complex rather than a definite salt between the amine and the acid. The formation of such complexes of variable composition has been previously noted with high molecular-weight amines and carboxylic acids. The solubilizing action of the excess amine may also be simply because the excess amine is a good solvent for the amine salt. Whatever the explanation, excess amine is helpful but is rarely economically advisable due to the high cost of amines compared to many other organic solvents. The amount of amine necessary to neutralize the phosphonic acid should be determined by titrating the amine with a strong acid, such as hydrochloric acid of known reacting strength, and titrating the phosphonic acid with sodium hydroxide or other suitable base of standardized strength by the widely known methods used in analytical chemistry.

Salts of phosphonic acids with most amines require a dual solvent made up of water-soluble and water-insoluble alcohol to form a clear solution. Many of the alcohols, such as methanol, isopropanol, and the octanols, are relatively inexpensive compared to most organic solvents, but are still expensive compared to hydrocarbons, such as kerosene, or even the aromatic fractions of petroleum. I have found that the salts of the phosphonic acids, with substituted imidazolines, can be dissolved in aromatic fractions of petroleum, together with a small amount of a water-soluble solvent, such as isopropanol, to form clear solutions. These concentrated solutions can then be diluted with aromatic petroleum fractions, or frequently even with ordinary kerosene, without the formation of a precipitate or a separate liquid phase. These abilities will be apparent from the following example.

EXAMPLE 1

A mixture of imidazolines was prepared from ethylene diamine and tall-oil fatty acids, as described in U.S. Pat. 2,468,163 Blair et al. This mixture of amines was reacted with a water solution of amino tri(methyl phosphonic acid) containing equal weights of water and acid. The resulting salts were dissolved in isopropanol and a heavy, aromatic naphtha obtained from petroleum. A clear solution resulted, having the composition described in Table I.

TABLE I

| Ingredient: | Percent by weight |
|---|---|
| Phosphonic acid | 5.5 |
| Imidazoline | 19.0 |
| Water | 5.5 |
| Isopropyl alcohol | 5.0 |
| Heavy aromatic naphtha | 65.0 |
| | 100.0 |

This composition remained clear when placed in a refrigerator for a week at 30° F. In a pour-point test, the solution remained clear and very fluid at −20° F. One volume of the solution was diluted slowly with nine volumes of ordinary kerosene. The solution remained clear through all ranges of dilution.

The ability of the solution to inhibit calcium sulfate scale was checked by the following procedure:

A solution of calcium chloride and a solution of sodium sulfate were mixed together. The concentrations of calcium chloride and sodium sulfate were sufficient to provide the equivalent of 6,000 parts per million by weight of calcium sulfate in supersaturated solution. Sodium chloride was also formed. Additional sodium chloride was dissolved in the sodium sulfate solution before mixing with the calcium chloride solution to bring the sodium chloride concentration in the final mixture up to 25,000 parts per million by weight. The solutions were mixed at room temperature, the scale inhibitors were added, and 200 milliliters of the inhibited solution were placed in a 300-milliliter tall-form beaker. The beaker was then placed in a hot water bath at 165° F. The solution came up to 165° F. in about 15 minutes, after which the beaker was allowed to remain in the bath for three hours. The precipitate was then filtered from the solution, dried and weighed. Comparison to a control sample run without inhibitor permitted calculating the percent of scale inhibition.

The composition shown in Table I provided 97.5 percent inhibition of calcium sulfate scale deposition when used in a concentration sufficient to give about 4.6 parts per million of the phosphonic acid. It is obvious from this test that the amine salt is a highly effective scale inhibitor.

A standard, static bottle test was run to determine the hydrogen sulfide inhibiting ability of the composition set out in Table I. In this test, 900 milliliters of air-free 5-percent sodium chloride brine, containing about 500 parts per million of hydrogen sulfide, are placed in a 1-liter flask. On top of the brine are placed 100 milliliters of oil containing the inhibitor. The concentration of inhibitor is based on total liquid, not on just the oil. A tared 1-inch square pre-weighed steel coupon, suspended on a glass rod, is lowered through the oil into the brine. A 10-second residence time of the coupon in the oil phase is allowed to permit the formation of a corrosion-inhibiting film. The bottle is stoppered and the coupon is left suspended in the brine for seven days. It is then removed, cleaned and re-weighed. Tests are run in duplicate and compared to duplicate controls which permit calculation of percent inhibition.

In this test, the composition of Table I, in a concentration of 83 parts per million, gave 76.4 percent inhibition, while 167 parts per million provided 93.8 percent inhibition.

EXAMPLE 2

In order to improve the corrosion-inhibiting ability of the composition, part of the phosphonic acid, water and heavy aromatic naphtha, in the composition of Table I, were replaced with a mixture of acids, which were mostly dimers and trimers of unsaturated, fatty acids having 16 or 18 carbon atoms per molecule of monomer. The resulting composition is shown in Table II.

TABLE II

| Ingredient: | Percent by weight |
| --- | --- |
| Phosphonic acid | 4.0 |
| Imidazoline | 19.0 |
| Water | 4.0 |
| Dimer-trimer acid | 5.0 |
| Isopropyl alcohol | 5.0 |
| Heavy aromatic naphtha | 63.0 |
| | 100.0 |

The revised composition of Table II provided 95.3 percent inhibition of hydrogen sulfide corrosion in the standard, static bottle test when the concentration was 83 parts per million. A concentration of 167 parts per million provided 95.9 percent inhibition.

The solution of Table II was somewhat more viscous than that of Table I due to the high viscosity of the polymer acids. The composition of Table II was dilutable with kerosene without forming a precipitate or separate liquid phase. It also remained very fluid and pourable with no precipitate formation or separation of liquid phases at 30° F. At temperatures below about 0° F., however, a slight settling of solids occurred and the liquid became rather viscous, although still pourable.

The amine salt of the carboxylic acid was obviously compatible with the amine salt of the phosphonic acid. The combination of salts provides a treating solution which can be squeezed into any formation, water-sensitive or not, to inhibit both corrosion and scale formation. The composition of Table II has also been successfully tested as an inhibitor for calcium carbonate scale and for corrosion by carbon dioxide and low-molecular weight carboxylic acids. The amine phosphonates have surface-active properties. They disperse and suspend, not only inorganic scale particles, but also organic particles, such as paraffin and asphalt. It will be apparent that this preparation is a universal inhibitor for the principal difficulties in wells. The heavy aromatic naphtha even acts as a paraffin solvent and, to some extent, as a paraffin-deposition inhibitor.

In the solution of Table II, a heavy polymer acid was used to improve the corrosion-inhibiting ability of the composition. Other corrosion-inhibiting carboxylic acids can be used. These include acids described in U.S. Pats. 2,756,211 Jones, 2,914,557 Oxford, 3,003,955 Jones, and 3,061,553 Riggs, for example. Amine salts for all these acids are compatible with the amine salts of the amino phosphonic acids. There is some variation in the degree of compatibility, however. Some of these acids, when substituted for the polymer acids used in the solution described in Table II, cause at least some phase separation upon dilution of the solution by kerosene. The solution remains clear upon dilution with aromatic naphtha. Since dilution with aromatic naphtha for paraffin removal and paraffin-deposition inhibition is often advisable anyhow, this solubility difficulty is not serious. The polymer acids are preferred, not only to avoid any compatibility or solubility problems, but because these acids also provide better results in other corrosion tests, such as the so-called "wheel" test. In general, the carboxylic acids should contain at least about six carbon atoms in the molecule and, preferably, at least about 12. The carboxylic acid may be completely or only partially neutralized by the amine, as described in the patents just noted. Use of an excess of carboxylic acid is not harmful and, in some cases, may be helpful.

The composition of Table II was tested in a well near Powell, Wyo. In this area, scale deposition was known to be a problem. String shots of explosives to break up the scale had been used with poor results. The well to be treated had, in the past, produced several hundred barrels per day of oil, but production had dropped to 42 barrels of oil with 24 barrels of water per day. The well was treated with a string shot to break up the scale. The broken scale was removed with a sand pump. The well was then treated with about 130 barrels (42 U.S. gallons per barrel) of crude oil containing about 160 gallons of the inhibitor composition of Table II. Another 130 barrels of crude oil were then injected to displace the treating solution away from the well. Two days after the treatment, the production had increased to 196 barrels of oil and 86 barrels of water. This is somewhat better than might have been expected from the string-shot treatment. With a string-shot treatment alone, the production should have started to decline from this point. Instead, after five days, the production had increased to 408 barrels of oil and 161 barrels of water. These and subsequent figures are presented in Table III.

TABLE III

| Days after treatment | Concentration of agent p.p.m. | Production rates, bbl./day | |
| --- | --- | --- | --- |
| | | Oil | Water |
| | | [1] 42 | [1] 24 |
| 2 | 130 | 196 | 86 |
| 5 | | 408 | 161 |
| 11 | | 312 | 172 |
| 35 | | 219 | 135 |
| 46 | 60 | | |
| 62 | 40 | | |
| 68 | | 204 | 138 |
| 74 | | 196 | 120 |
| 77 | 80 | | |
| 89 | 60 | | |
| 102 | | 237 | 120 |
| 103 | 40 | | |
| 117 | 50 | | |
| 122 | | 198 | 132 |

[1] Before treatment.

The concentration of agent given in Table III was determined by measuring the phosphonate concentration in the produced water. The concentration in the produced oil is not known. The phosphonate concentration was measured by oxidizing it to phosphate and determining the phosphate concentration colorimetrically by the molybdate method. The important point is that the agent continued to flow slowly out of the formation for at least four months at a concentration more than enough to give good scale inhibition. The continued high production of both oil and water shows that the inhibitor was doing an excellent job of preventing re-plugging of both the oil-producing and water-producing zones by scale and organic deposits. The continued increase in production for five days after the initial treatment is probably due to a continued cleaning of the pores of the formation by the solids-dispersing action of the treating composition.

Ordinarily, the well should be re-treated by squeezing another batch of the composition into the formation when the concentration of the entire composition falls to about 20 or 25 parts per million. Since the composition contains about 4-percent phosphonic acid, this means re-treating when the concentration of phosphonic acid in the produced water drops below about one part per million. It should be noted, however, that in many areas a concentration considerably lower than this value will be adequate, while in others a somewhat higher minimum concentration may be found to be desirable.

In addition to the actions described above, the composition has also been found to be effective as a retarder of the action of acids, such as hydrochloric acid, on limestones. In one case, for example, an oil solution of the composition of Table I reduced by more than 50 percent the rate of reaction of hydrochloric acid with limestone. It is proposed, therefore, that an oil solution of the amine phosphonate be introduced ahead of acids used for acidizing earth formations. The composition not only decreases the acid reaction rate, thus insuring better penetration of the acid into the formation, but, upon returning to the well, the amine phosphonate also cleans the acidized formation and inhibits corrosion and scale formation.

Other applications include use as detergents, metal carriers, and the like, in lubricating oils, as mentioned in U.S. Pat 2,841,611 Bersworth. Use for similar purposes in fuel oils, or other oil products, is also possible. Still other applications will be apparent to those skilled in the various arts.

Many alternates and variations are described above by way of example. Others will occur to those skilled in the art. Therefore, I do not wish to be limited to these examples, but only by the following claims.

I claim:

1. A reaction product of a substituted imidazoline and an aqueous solution of an amino tri(lower alkylidene phosphonic acid), said imidazoline having the formula

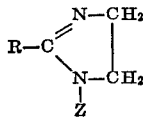

in which at least one of R and Z is a hydrocarbon radical selected from the group consisting of aliphatic and cycloaliphatic radicals containing from 8 to 32 carbon atoms, and otherwise being hydrogen, said phosphonic acid having the formula

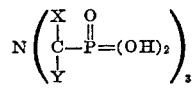

in which X and Y are selected from the group consisting of hydrogen and lower alkyl groups, the amount of said imidazoline being sufficient to react with at least about ½ of said phosphonic acid, and the amount of water being from about ½ to about 5 times the weight of said phosphonic acid.

2. The reaction product of claim 1 in which said acid is amino tri(methyl phosphonic acid), said imidazoline is a mixture produced from ethylene diamine and tall-oil fatty acids, said imidazoline being present in an amount at least about ¾ that necessary to neutralize said acid and said water is from about ½ to about two times the weight of said acid.

References Cited

UNITED STATES PATENTS

| | | | |
|---|---|---|---|
| 2,468,163 | 4/1949 | Blair et al. | 252—8.55 E |
| 3,116,249 | 12/1963 | Ratner et al. | 260—309.6 |
| 3,234,124 | 2/1966 | Irani | 260—429 R |
| 3,346,488 | 10/1967 | Lyons et al. | 252—8.5 C |
| 3,524,908 | 8/1970 | Redmore | 260—309.6 |
| 2,841,611 | 7/1958 | Bersworth | 260—502.5 |

HENRY R. JILES, Primary Examiner

S. D. WINTERS, Assistant Examiner

U.S. Cl. X.R.

252—8.55 E, 389, 363.5; 260—502.5